United States Patent Office 3,289,387
Patented Dec. 6, 1966

3,289,387
VACUUM BALING APPARATUS
Arthur F. Stagmeier, New York, and Harry E. Rothmann, Valhalla, N.Y., assignors to General Foods Corporation, White Plains, N.Y., a corporation of Delaware
Filed Mar. 29, 1963, Ser. No. 268,883
12 Claims. (Cl. 53—112)

This invention relates generally to the packing, for shipping or storage purposes, of a bale or bundle of individual packages and has particular relationship to the packing of said individual packages under a vacuum so as to protect the product contained therein from undesirable affects which could result from exposure thereof to atmosphere.

The invention has particular utility in the food processing industry for the packing of products such as ground and roasted coffee put up in packages of sizes suitable for use by the ultimate consumer. For convenience to the consumer it has been the practice to package a product such as coffee in individual paper bags which may, for example, contain one pound or less of the product. The use of bags for this purpose has been found to be a convenient and economic media for containing the product especially in instances where the product is being used by a consumer such as an institution or a food vendor which may use the product in relatively large quantities. Customarily, the individual packages of the product, which may be in one pound or less bag form, are assembled together in a bundle and placed in a larger container also in bag form which is generally known as a shipper for delivery to the consumer. It is obviously desirable to protect the product from adverse affects from exposure to atmosphere during the period required for shipment or transit to the consumer and also during the shelf-time before actual use of the product by the consumer. However, hermetic sealing of the individual packages by conventional practices would add considerably to the cost of the product since it would require for each individual package special packaging material to be employed and additional processing by special equipment for accomplishing this purpose, thus making the cost objectionably high.

The invention overcomes the aforementioned problems by provision of a shipper which is capable of being hermetically sealed and by provision of a simplified and approved apparatus for effecting the sealing of the shipper. In this way, hermetic sealing of the product can be accomplished at a considerably reduced cost than if the individual packages themselves were thus sealed since only the shipper itself needs to be made of air impervious materials capable of protecting the product from atmospheric exposure. Furthermore, the processing expense for effecting the hermetic sealing of the product is also considerably reduced by practice of the invention, together with the amount of equipment required for carrying out the hermetic sealing processing, since the one sealing process for a single shipper effects the sealing of a plurality of individual packages.

According to the invention the shipper may comprise an ordinary flat bag formed of sheet material such as kraft paper of a weight suitable for shipping purposes, for example, 50 pound weight, having a ply of metal foil, such as aluminum foil, bonded to the inner surface thereof. This foil may be bonded to the surface of the paper by a thermoplastic medium such as polyethylene, the inner surface of the metal foil also preferably being coated with the same thermoplastic material, at least in the area of the mouth of the bag, so as to enable the mouth to be sealed by application of heat and pressure. The apparatus for effecting the hermetic sealing of the shipper after being filled with a plurality of individual packages of the product includes a reciprocable nozzle communicating through appropriately controlled valves with a vacuum pump and also preferably with a supply of inert gas. The nozzle is of a unique construction such that when inserted into the open mouth of the filled shipper it acts to laterally spread the walls of the shipper causing the mouth to collapse about the contour of the nozzle and enabling a vacuum to be drawn without requiring additional means for pressing the mouth of the bag around or in contact with the surface of the nozzle. This feature has the advantage of causing the mouth of the shipper or bag to collapse uniformly by atmospheric pressure acting thereon with a minimum of wrinkling of the bag surface. Thereafter, after the mouth of the bag has been substantially collapsed, pressure rollers are provided to engage the sides of the bag and preserve the seal during the time that the inert gas is being introduced into the shipper and while the nozzle is being withdrawn to a position enabling heat sealing jaws to be operated to fuse together the mouth of the bag and effect a permanent seal.

It is therefore an object of this invention to improve upon the means for packing for shipping and storage purposes a plurality of packages enclosing a product adversely affected by exposure to atmosphere.

It is a further object of this invention to provide an improved shipper for a plurality of packages containing a product susceptible to deleterious affects by exposure to atmosphere.

It is a still further object of this invention to improve upon apparatus for hermetic sealing under vacuum a bag form of container adapted for shipment of a plurality of packages.

Further objects of the invention together with the features contributing thereto and the advantages accruing therefrom will be apparent from the following description when read in conjunction with the drawing wherein.

Figure 9:
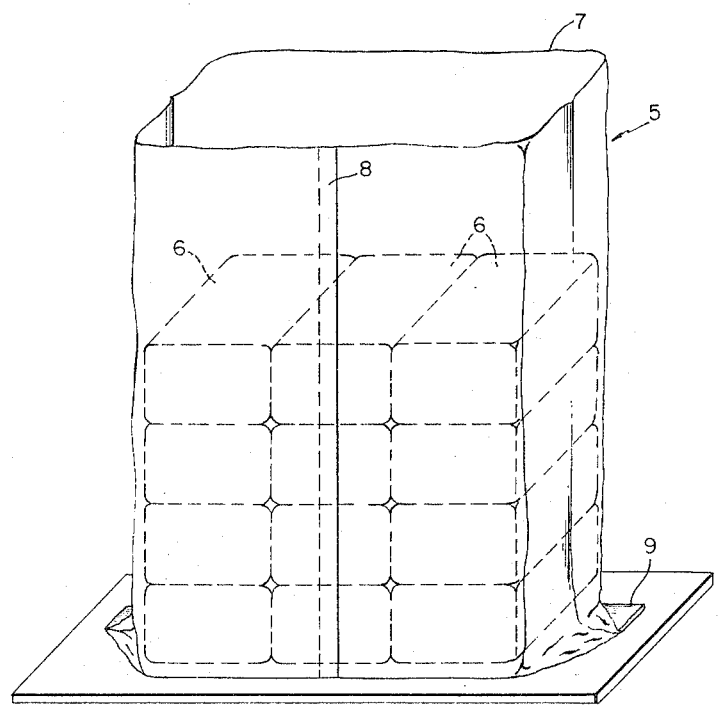
FIG. 9 is a view of the shipper loaded with contents and in the form that it assumes in preparation for processing by the sealing apparatus of the instant invention.

Referring now to FIG. 9, the shipper 5 is shown in the condition it assumes when packed with a plurality of individual packages 6 in preparation for a sealing operation by the apparatus to be hereinafter described. The individual packages 6 are preferably stacked in such a manner as to constitute a bundle of substantially rectangular configuration, and in the present instance they are shown as consisting of individual bags lying sidewise and arranged in horizontal rows of three each, there being four such rows stacked one upon another as to constitute a bundle of twelve packages in all. Each of the packages 6 contains the product to be protected by shipper from exposure to atmosphere, the product being, for example, freshly ground and roasted coffee or the like, the packages 6 being the usual one-pound bags of the same which are ordinarily not hermetically sealed nor made of air-impervious material. It should of course be understood that the individual packages 6 may be of other dimensions than shown, and may be stacked in a bundle consisting of more or less than twelve, the bundle, however, being preferably one of rectangular configuration regardless of the size or number of the individual packages which fill the shipper 5 to an extent representing about half of its volume. When thus packed, the upper walls of the shipper surrounding the free space, or unfilled area thereof, will follow the general contour of the bundle contained therein so as to maintain the top edge 7 thereof, constituting the mouth of the shipper, in an open substantially rectangular condition corresponding to the rectangular contour of the bundle.

The shipper 5 comprises a sheet of web material which has been formed into a bag, which may be the ordinary flat bag having a side seam 8 and a bottom seam 9, which seams, it should be understood, are hermetically sealed during formation of the bag.

Figure 11:
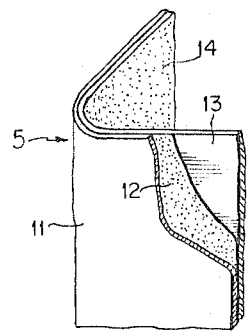
FIG. 11 is a fragmentary view of the shipper illustrating its laminated construction.
Figure 10:
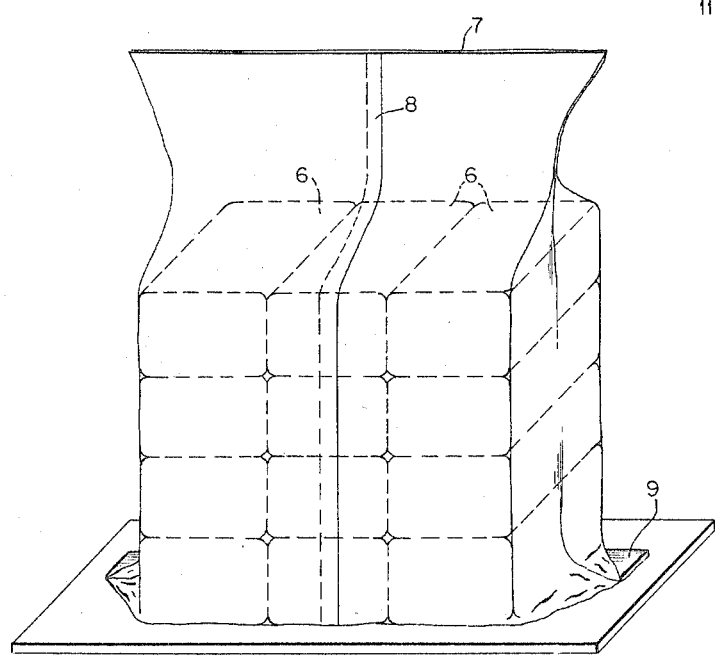
FIG. 10 is a view of the shipper in the form it assumes after having been sealed by the apparatus of the instant invention.

FIG. 11 is a fragmentary view of the shipper 5 illustrating the laminar construction of the sheet material from which the shipper is formed. The outer layer or lamination 11 may consist of a web of paper such as kraft paper of a weight suitable for shipping purposes which, for example, may be fifty pound weight. Applied to the inner surface of the lamination of paper 11 is a coating of thermoplastic material 12 which may be, for example, polyethylene or the like, as indicated by the strippling in FIG. 11. The thermoplastic material 12 serves as a means for bonding to the inner surface of the paper 11 any other lamination of web material impervious to air and moisture, such material being preferably a metal foil 13, such as aluminum foil or the like. Coating the inner surface of the foil material 13 is another layer or coating of thermoplastic substance 14, which may be polyethylene or the like, which provides a means whereby the seams of the shipper may be hermetically formed and sealed upon the application of suitable heat and pressure. It will be apparent that with the shipper 5 formed of sheet material of laminar construction with materials as just described, and when the mouth thereof is hermetically sealed together to form a shipping bundle, as illustrated in FIG. 10, by the apparatus hereinafter to be described, the transfer of air or moisture to the interior of the shipper is prevented, enabling the shipper to retain its contents under vacuum, or in the presence of an inert gas introduced into the shipper before sealing as hereinafter to be described, for relatively long periods of time.

Figure 1:
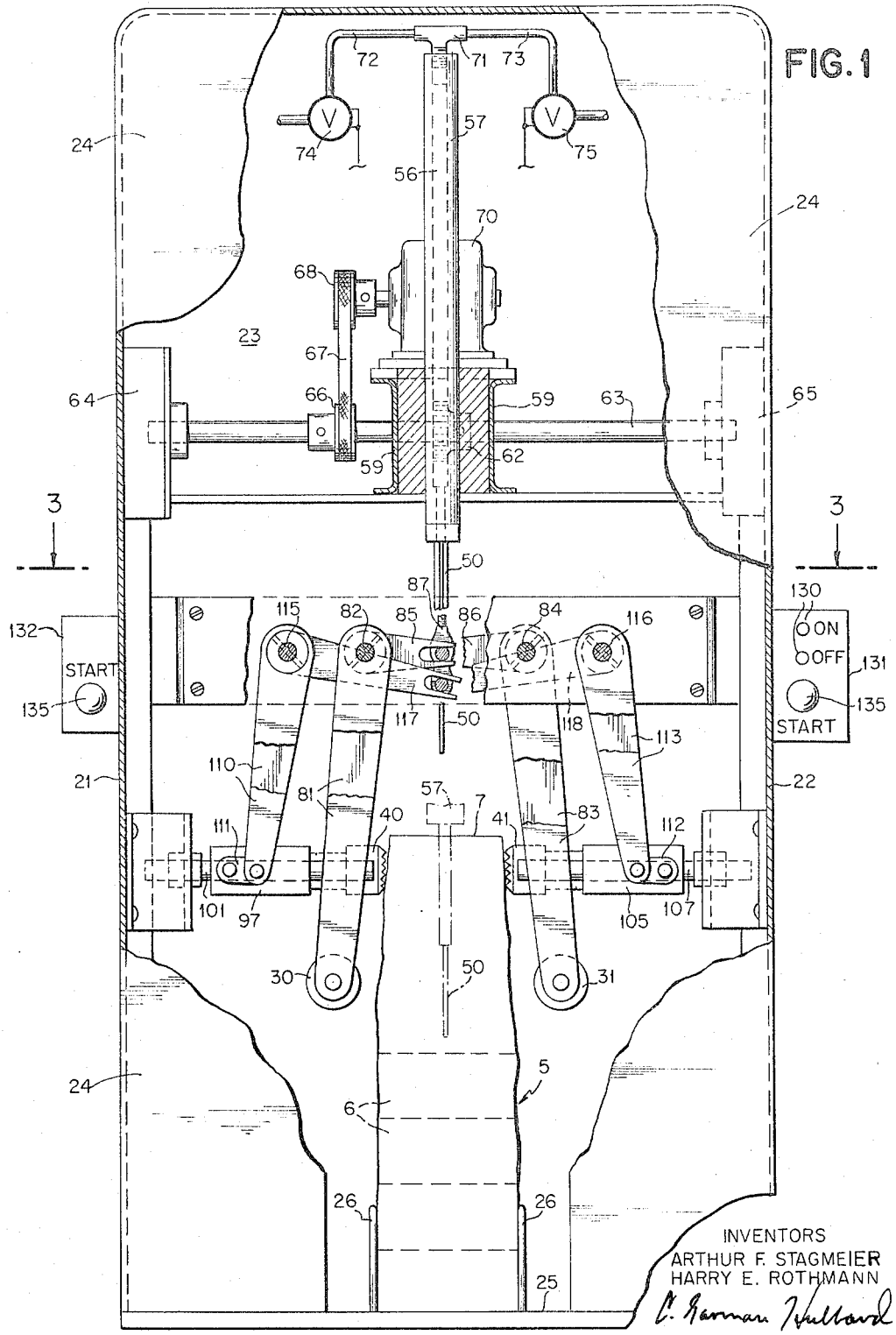
FIG. 1 is a front elevation of the machine with the front frame panel partially broken away to expose the operating mechanism.
Figure 2:
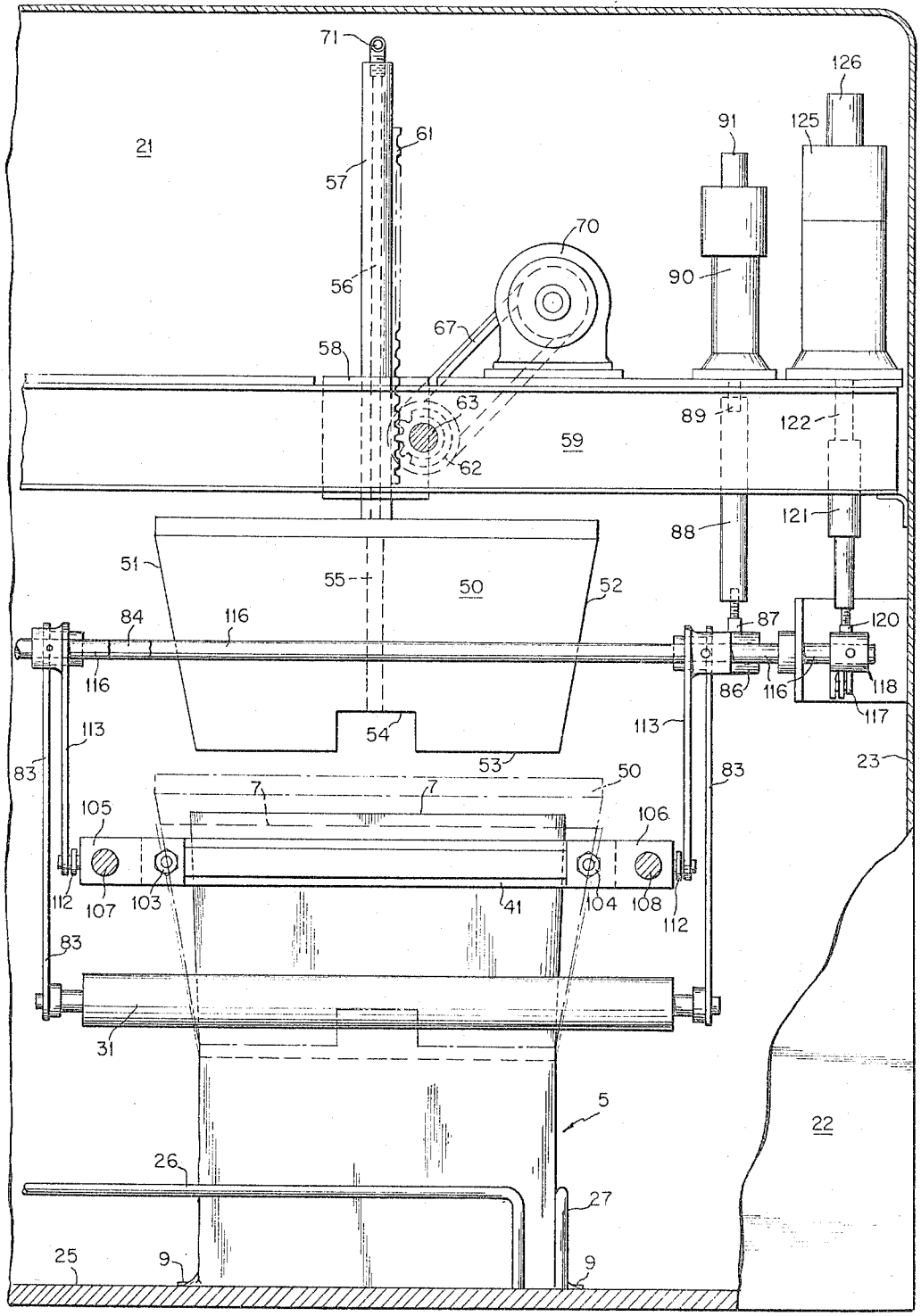
FIG. 2 is a side elevation of the mechanism shown in FIG. 1 as viewed from the right hand side.
Figure 3:
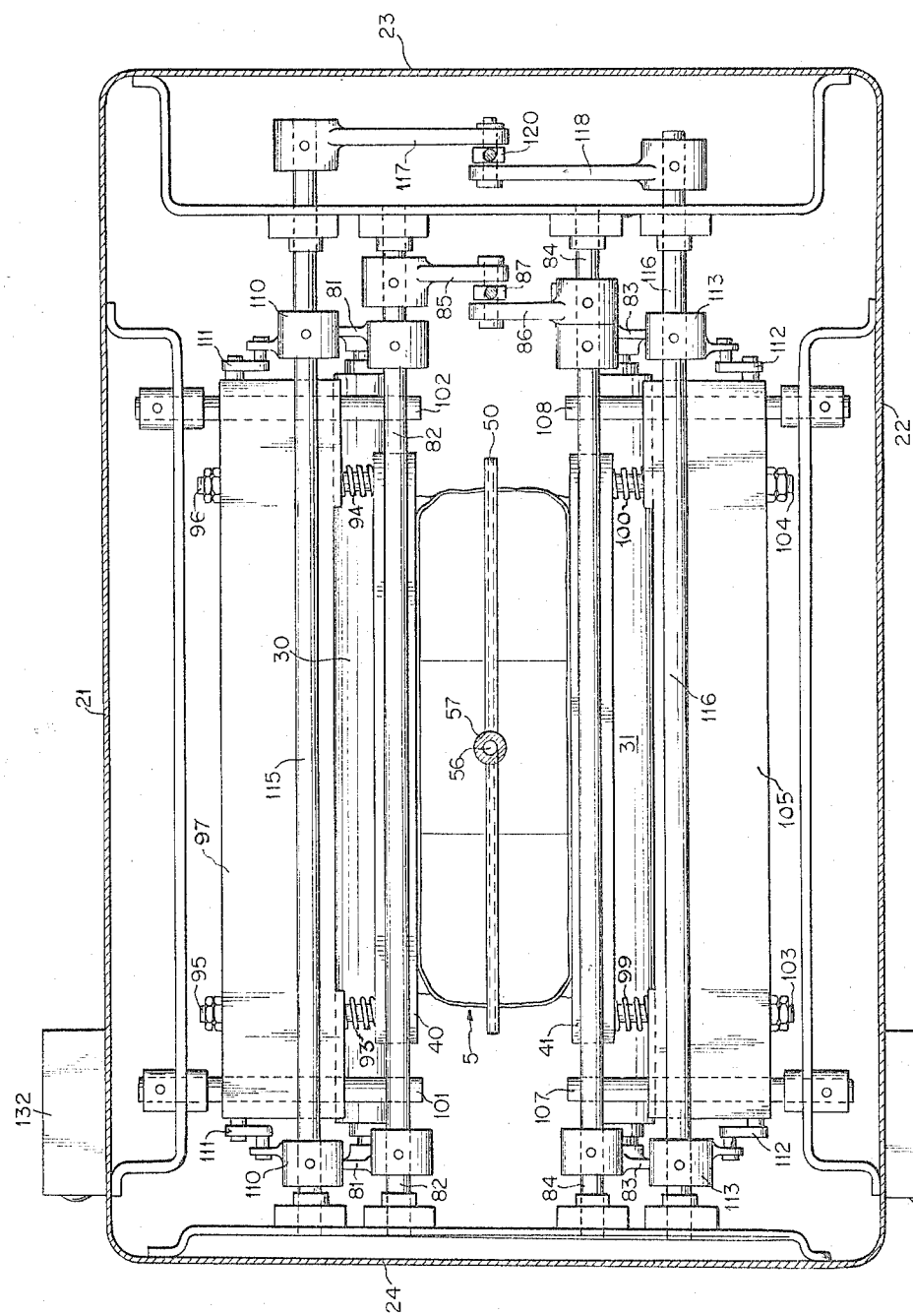
FIG. 3 is a sectional view taken along the line 3—3 of FIG. 1.

Referring now to FIGS. 1, 2 and 3, it will be seen that the apparatus for sealing the shipper 5 is contained in a cabinet having side walls or panels 21, 22 respectively, and rear and front walls 23, 24, respectively. The bottom panel 25 of the cabinet comprises a platform for supporting the shipper 5 in position for processing by the operating members of the mechanism. To facilitate the proper positioning of the shipper relative to the operating members, a pair of side guide rails 26 are secured to the platform 25 which, in cooperation with a backrest or limit rail 27, also secured to the platform, serve to center the shipper relative to the apparatus when inserted into the cabinet through a suitably formed opening or door, not shown, in the front panel 24.

As can be best seen in FIG. 1, when the shipper is in proper position on the platform 25, the upper section thereof above the level of the contained bundle of individual packages is disposed between a pair of opposed rolls 30, 31 and a pair of opposed bars 40, 41. The rolls 30, 31 are pressure applying members, and the bars 40, 41 constitute heat sealing jaws which are shown in FIG. 1 in the open position and which are operated during the processing cycle through means and in a manner to be hereinafter described. It will be noted that the distance between the bars 40, 41 is slightly less than the width of the bundle of individual packages stacked within the shipper, thus requiring that the sides of the upper section of the shipper be slightly compressed in order to fit between the bars 40, 41. This partial compression of the sides of the shipper tends to elongate the mouth of the shipper by spreading apart the ends of the upper section of the shipper, which can also be seen in FIG. 2, for purposes to be explained more fully hereinafter, and may be accomplished manually by the operator when inserting the shipper in position on the platform or, alternatively, could be accomplished through suitably placed cam members, not shown, engaging the sides of the shipper as it is placed in operating position.

Disposed directly above the shipper is a vertically reciprocable nozzle 50 which has a flat spade-like configuration and is formed with end edges 51, 52 which taper outwardly from the bottom to the top thereof. The bottom edge 53 is formed with a notch 54 cut out of its central area, and extending from the notch 54 centrally of the nozzle is an interior bore 55 communicating with an axial bore 56 in a vertically extending rod 57 to which the nozzle is attached. The rod 57 is slidably fitted in a supporting sleeve 58 suitably mounted on frame bars 59 extending between and secured to the front and rear walls of the cabinet. The rod 57 has secured integrally thereto a rack 61, the teeth of which mesh with a pinion 62 mounted fast on a shaft 63 suitably journaled at its ends in bearings 64, 65 secured to the side walls 21, 22 of the cabinet. Also mounted fast on the shaft 63 is a pulley 66 about which is wrapped a drive belt 67 which runs to a pulled 68 mounted on the shaft of a reversible motor 70, said motor being suitably mounted on the frame bars 59. It will be evident that energization of the motor in one direction will operate through the drive train just described to lower the nozzle 50 into the open mouth of the shipper 5 and that energization of the motor in the other direction will operate to raise or elevate the nozzle to its retracted position, the fully lowered position of the nozzle being indicated by dotted lines in FIGS. 1 and 2.

With particular reference to FIG. 2, it will be noted that the slight spread of the ends of the bag mouth as a result of the compression of the sides of the bag when placed into position between the bars 40, 41 provide for easier access of the nozzle into the bag mouth. The nozzle as it descends into the open mouth, due to the taper of its end edges 51, 52, operates to further spread the ends of the bag to its full spreadable limit, as indicated in dotted lines in FIG. 2, so that when the nozzle is fully inserted into the open upper end of the shipper, the upper edge 7 of the shipper is drawn taut, causing the sides of the shipper to be sufficiently collapsed about the nozzle to effect a seal and enabling air to be evacuated from the interior of the shipper when the nozzle is connected to a vacuum pump as hereinafter to be described. As best seen in FIG. 1, connected to the top of the nozzle supporting rod 57 and communicating with the bore 56 therein is a T connection 71 joined to a pair of flexible conduits 72, 73. Conduit 72 runs to an electrically controlled valve 74 and thence to a supply of inert gas such as $CO_2$ or the like, and conduit 73 runs to an electrically controlled valve 75 and thence to a vacuum pump. The valves 74, 75 are operated in a mutually exclusive manner by a timing mechanism so as to first evacuate air from the shipper and then, if desired, to introduce an inert gas into the shipper at the proper stage of the processing operation.

In carrying out the processing operation, the rolls 30, 31 are operated at a predetermined stage of the operation to temporarily maintain a seal while the inert gas is being introduced into the shipper and while the nozzle is being retracted to the point where the heat sealing jaws 40, 41 can be operated to effect a permanent seal of the mouth of the shipper. The rolls 30, 31 are formed of a compressible material such as sponge rubber or the like, the roll 30 being carried by a pair of depending rock arms 81 secured fast to a rock shaft 82 suitably supported in brackets secured to the front and rear wall of the cabinet. The roll 31 is similarly carried by a pair of depending rock arms 83 secured fast to a rock shaft 84 similarly supported at its extremities by the front and rear walls of the cabinet.

Secured to the rearmost end of the rock shaft 82 is a rock arm 85, and a similar rock arm 86 is secured to the rearmost end of shaft 84. Each of said rock arms 85, 86 operatively engages through a pin and slot connection a pull rod 87 joined by a coupling 88 to a connecting rod 89 operated by the piston of a pneumatic actuator 90. Actuator 90 is connected to a suitable source of compressed air or the like and is driven in one or another direction under control of a solenoid control valve 91. Energization of the control valve 91 causes the actuator 90 to drive its piston upwardly, thus pulling upwardly on the pull rod 87 to rock shafts 82, 84 in a direction which will cause the pressure rolls 30, 31 to close inwardly upon the upper section of the shipper and to hold the sides of the shipper in close sealing contact with the flat sides of the nozzle 50. De-energization of the control solenoid 91 operates to drive the piston of the pneumatic actuator downwardly so as to drive the pressure rolls 30, 31 to their open position as shown in FIG. 1.

The heat sealing bars 40, 41 are each formed of metal having good heat conducting properties, each containing a heating cartridge, not shown, by which the temperature of each bar is maintained at a sufficient level to cause fusion of the thermoplastic material coating the inner surface of the shipper when the bars are moved to their closed sealing position. The bar 40 is yieldably and adjustably supported at each end thereof, in cooperation with compression springs 93, 94, by threaded studs 95, 96 mounted in a carrier 97 slide fitted for horizontal reciprocation on stud shafts 101, 102, respectively. the shafts being suitably secured in a bracket mounted on the side wall frame panel 21 of the cabinet. The heat sealing bar 41 is similarly supported, in cooperation with compression springs 99, 100, by threaded studs 103, 104 mounted in a carrier 105 slide fitted on stud shafts 107, 108, respectively, suitably secured in a bracket mounted on the side wall frame panel 22 of the machine. The carrier 97 which supports the heating bar 40 is pivotably joined to associated rock arms 110 by links 111, and the carrier 105 which supports the heating bar 41 is pivotally joined through links 112 with associated rock arms 113. The rock arms 110 are mounted fast on a rock shaft 115, and the rock arms 113 are mounted fast on a rock shaft 116, said shafts being suitably journaled at each end thereof in brackets secured to the front and rear panels 23, 24 of the cabinet. A rock arm 117 secured fast to shaft 115 and a rock arm 118 secured fast to the shaft 116 are bifurcated at their extremities to form a pin and slot connection with a pull rod 120 connected by means of a coupling 121 with a connecting rod 122 operated by the piston of a pneumatic actuator 125. The actuator 125 is controlled by solenoid control valve 126 which when energized drives its piston upwardly so as to pull on the pull rod 120 and rock the shafts 115, 116 in a direction to drive the heat sealing bars 40, 41 together, thereby gripping and compressing together the side walls of the shipper to fuse the same and effect a seal of the mouth of the shipper after the nozzle 50 has been withdrawn. De-energization of the control solenoid 126 drives the piston of the pneumatic actuator in the opposite direction to cause the heat sealing bars to withdraw and separate to their open position, in which position they are shown in FIG. 1. The coacting faces of heating bars 40, 41 may be formed in any suitable manner to effect a proper fusion of the shipper mouth, such as being serrated so as to provide a crimped seal, or they may be formed with a longitudinally extending groove in one and a longitudinally extending mating tooth in the other so as to effect a partially folded seam in the walls of the shipper, or any other suitable configuration of the jaws of the heat seal bars may be adopted to achieve the corresponding type of seam which may be desired.

Figure 4:
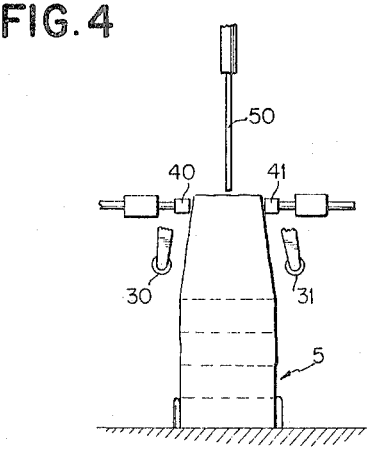
FIGS. 4 through 7 are a series of schematic operational views illustrating the relative positions of the operating mechanism at various stages during a cycle of operation.
Figure 8:
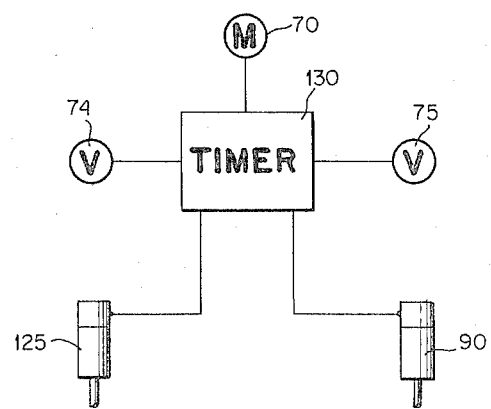
FIG. 8 is a schematic view illustrating the timing control over the various functions of the apparatus.

The sequence of operation of the various mechanisms is under control of a timer 130, as schematically shown in FIG. 8, the timer being of any conventional construction suitable for the purpose and consisting, for example, of a one-revolution shaft carrying a plurality of cams effective for closing switches in a predetermined sequence and for predetermined time intervals. As indicated in FIG. 8, the timer exercises control over the motor 70 which drives the nozzle 50 as heretofore described, also the valve 74 communicating with a source of inert gas, the valve 74 communicating with a vacuum pump and the pneumatic actuators 90, 125 which control the pressure rolls 30, 31 and the heat sealing jaws 40, 41, respectively, as heretofore described. The operational sequence of the parts is depicted in the views of FIG. 4 through FIG. 7. FIG. 4 illustrates the position of the operating mechanisms after a shipper has been placed in operative position within the cabinet in preparation for processing. It will be noted that the nozzle 50 is in its fully elevated or retracted position and that the heat sealing jaws 40, 41 and the pressure rolls 30, 31 are also in their fully retracted open position.

Figure 5:
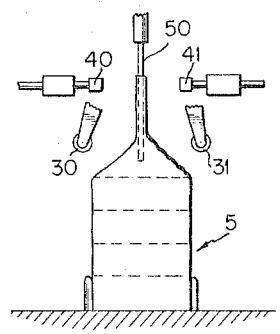

The first operation in the processing cycle is the lowering of the nozzle into the mouth of the bag to the position shown in FIG. 5. This step may, if desired, be under manual control to permit nozzle retraction in case the shipper is misplaced and crumples under the nozzle action. This movement of the nozzle as heretofore described, due to the tapered end edges of the nozzle, operates to spread the top edge of the shipper taut, causing the upper side sections of the bag to collapse inwardly against the sides of the nozzle under sufficient stress to enable a vacuum to be drawn on the interior of the shipper. As soon as the nozzle is inserted to its lowest limit into the bag, the timer operates valve 75 to connect the nozzle with the vacuum pump to evacuate air from the interior of the shipper, causing the sides of the shipper to completely collapse and press against the sides of the nozzle, which is the condition of the shipper shown in FIG. 5.

Figure 6:
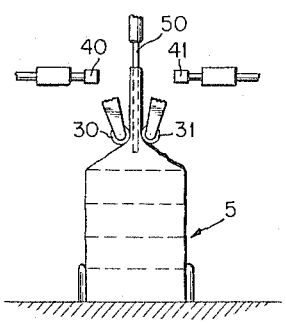
Figure 7:
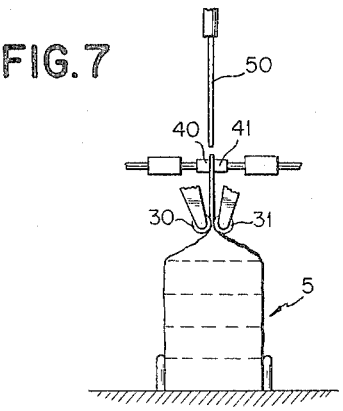

The next step in the processing cycle is the actuating of the pressure rolls 30, 31 which close in against the collapsed section of the shipper, pressing the sides thereof against the nozzle so as to preserve and maintain the seal until the mouth is permanently sealed by operation of the heat sealing jaws 40, 41, later in the processing cycle. FIG. 6 illustrates the pressure rolls in their closed sealing position compressing the sides of the shipper against the nozzle 50. It should be pointed out that the pressure rolls 30, 31 in moving to the closed position do not carry the sides of the bag into the collapsed position shown but merely are brought to bear against the sides of the bag after it has collapsed by action of atmospheric pressure after the air within the bag has been substantially evacuated. This feature of operation tends to cause the sides of the bag to collapse into smooth even contact with the nozzle with a minimum of wrinkling due to the uniform application of atmospheric pressure thereon, which would not be the case if the collapse of the bag were effected by the operation of the pressure of rolls moving into closed position.

If it is desired to introduce into the shipper an inert gas, this step of the processing cycle next occurs under control of the timer which would actuate valve 74 communicating with a supply of the gas allowing a predetermined amount of the gas to enter the shipper through the nozzle over a predetermined time interval. Preferably, the amount of gas introduced is less than the amount of air which had been evacuated so as to maintain the shipper under partial vacuum.

The next step in the processing cycle is the withdrawal of the nozzle from the bag, and this is accomplished while the pressure rolls 30, 31 are maintained in their closed position, so that as the nozzle is being withdrawn, the opposite sides of the shipper are held pressed together to maintain this seal during the withdrawal of the nozzle. After the nozzle has been withdrawn a sufficient extent to clear the heat sealing jaws, the pneumatic actuator 125 is rendered effective under control of the timer to drive the heat sealing jaws 40, 41 to their closed position, holding them closed for a sufficient time interval to effect fusing of the thermoplastic coating lining the interior of the shipper, this position of the mechanism being shown in FIG. 7. After the necessary time interval has passed for effecting the fusing of the mouth of the shipper, the heat sealing jaws 40, 41 and the pressure rolls 30, 31 are retracted under control of the timer to their fully open position whereupon the shipper may be removed from its platform in the cabinet, and the cycle is completed with the mechanism in position for the beginning of the next cycle of operation.

As seen in FIG. 1, the operating controls for the apparatus include an "On-off" switch 130 which connects the machine to a suitable source of electric power, which switch is preliminarily switched on prior to the start of a processing operation to enable the heating cartridges in the heat sealing jaws to warm up the jaws to operating temperature. Switch 130 is mounted on a control panel 131 secured to the right hand frame 22 of the machine. The controls also include a pair of "Start" buttons 135 of which one is mounted on panel 131 and of which the other is mounted on a similar control panel 132 secured to the left hand frame of the machine, the buttons 135 operating switches connected in series for completing a circuit to start a processing operation. The provision of two "Start" buttons, disposed on opposite sides of the machine, is a safety precaution to require the use of both hands of the operator in starting the processing operation, thereby precluding the possibility of the operator having a hand within the cabinet at the time that the operating members of the machine are activated.

While there has been shown and described what is considered to be a preferred embodiment of the invention, it will of course be understood that various changes in form could be made without departing from the spirit of the invention, and it is therefore intended that the invention be not limited to the exact form herein shown and described nor to anything less than the whole of the invention as hereinafter claimed.

What we claim and desire to secure by Letters Patent is:

1. In a packaging machine of the character described for sealing the mouth of a container formed of flexible air-impervious sheet material, means for supporting said container in an operative position within said machine, nozzle means comprising a substantially flat member insertable into the mouth of said container and formed with opposed end edges which taper outwardly from the leading edge thereof to spread apart opposite ends of the container mouth to collapse the sides of said container around said nozzle member, said nozzle means communicating with means operative for evacuating air from said container when said nozzle means is inserted in said container mouth, pressure applying means disposed on opposite sides of said container and coactuable to engage the collapsed sides of the container for maintaining a temporary seal of said container mouth after the said air evacuating means becomes inoperative and said nozzle means is being withdrawn, and means disposed on opposite sides of said container and coactuable after said nozzle means is withdrawn and while said pressure applying means is activated for adhering together the opposed side walls of said container to effect a permanent hermetic seal between the interior and exterior of said container.

2. The invention according to claim 1 wherein the means for adhering together the side walls of said container comprise heated bars mounted for reciprocable movement towards and away from each other and when moved towards each other being adapted to grip the side walls of said container and apply pressure thereto to effect a seal therebetween.

3. The invention according to claim 2 wherein said heated bars are reciprocated by activation of a pneumatic actuator.

4. The invention according to claim 1 wherein said pressure applying means comprise rolls formed of resilient material and adapted to yieldingly conform to the contour of said nozzle member when activated into pressure applying position.

5. The invention according to claim 4 wherein said rolls are moved into pressure applying position by activation of a pneumatic actuator.

6. In a packaging machine of the character described for sealing the mouth of a container formed of flexible air-impervious sheet material, means for supporting said container in an operative position within said machine, a nozzle member projectable into the mouth of said container and formed with substantially flat sides terminating in opposed end edges which taper outwardly from their junction with the leading edge thereof adapted to spread apart opposite ends of the container mouth to collapse the sides of said container around said nozzle member, means for reciprocating said nozzle member to project and withdraw same into and from the mouth of said container, means communicating with said nozzle member for evacuating air from said container, means communicating with said nozzle member for introducing gas into said container, pressure applying means disposed on opposite sides of said container and coactuable after said air evacuation means have been activated for maintaining a temporary seal of said container mouth after said air evacuating means is deactivated, and means disposed on opposite sides of said container and coactuable after said nozzle member is withdrawn for adhering together the opposed side walls of said container to effect a permanent hermetic seal between the interior and exterior of said container.

7. The invention according to claim 6 wherein the means for adhering together the side walls of said container comprise heated bars mounted for reciprocal movement towards and away from each other, and when moved towards each other being adapted to grip the opposed side walls of said container and apply pressure thereto to effect a seal therebetween.

8. The invention according to claim 6 wherein said pressure applying means comprise rolls formed of resilient material adapted to yieldingly conform to the contour of said nozzle means when activated into pressure applying position.

9. The invention according to claim 6 wherein said pressure applying means are disposed for engaging an area of the collapsed sides of said container remote from the edges defining said container mouth, and wherein said adhering means are disposed to engage an area of the collapsed sides of said container proximate the edge defining said container mouth.

10. The invention according to claim 6 including means for timing the activation of said air evacuation means and said gas introducing means to render said gas introducing means effective subsequent to the period in which said air evacuation means is activated.

11. The invention according to claim 10 wherein said timing means controls said pressure applying means to render said pressure applying means effective after said air evacuation means is activated and before said gas introducing means is activated.

12. In a packaging machine of the character described for sealing the mouth of a container formed of flexible air-impervious sheet material, means for supporting said container in an operative position within said machine, a nozzle member projectable into the mouth of a container and formed to provide a longitudinal leading edge and substantially flat sides terminating in opposed end edges tapering outwardly from their juncture with the extremities of said leading edge, said end edges being adapted to engage with and spread apart opposite ends of the container mouth to collapse the sides of said container into contact with the sides of said nozzle member while being projected into the container mouth, means for reciprocating said nozzle member to project and withdraw same into and from the mouth of said container, means communicating with said nozzle member and effective when said nozzle member is projected into the mouth of said container for evacuating air from the container, means communicating with said nozzle member and effective subsequent to the deactivation of said air evacuating means for introducing gas into said container, pressure applying means including rolls formed of resilient material disposed on opposite sides of said container and coactuable after said air evacuation means is activated to engage the collapsed sides of the container over an area thereof removed a predetermined distance from the mouth of said container for maintaining a temporary seal of said container mouth after said air evacuating means is deactivated, and means including heated bars disposed on opposited sides of said container and coactuable after said nozzle member is withdrawn and while said pressure applying means is activated for fusing together the opposed side walls of said container over an area proximate the mouth of the container to effect a permanent hermetic seal between the interior and exterior of said container.

References Cited by the Examiner
UNITED STATES PATENTS

| | | | |
|---|---|---|---|
| 2,281,187 | 4/1942 | Waters | 53—112 X |
| 2,732,988 | 1/1956 | Feinstein | 53—112 |
| 2,840,964 | 7/1958 | Kissling | 53—112 X |
| 2,863,267 | 12/1958 | Moore | 53—112 X |
| 2,889,673 | 6/1959 | Rackland | 53—112 |
| 3,051,307 | 8/1962 | Hoey | 206—65 |
| 3,058,586 | 10/1962 | Touart | 206—65 |

TRAVIS S. McGEHEE, *Primary Examiner.*

THERON E. CONDON, *Examnier.*

M. L. RICE, *Assistant Examiner.*